United States Patent
Goff et al.

(10) Patent No.: US 6,307,336 B1
(45) Date of Patent: Oct. 23, 2001

(54) CLOSED LOOP CONTROL OF PWM DUTY CYCLE

(75) Inventors: Kenneth W. Goff, Huntingdon Valley; Jerry K. Goff, deceased, late of Doyleston; by Kenneth W. Goff, executor, Huntingdon Valley; Brian J. Fenstermacher, Telford, all of PA (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/405,775

(22) Filed: Sep. 27, 1999

(51) Int. Cl.[7] ............................................. H02P 7/06
(52) U.S. Cl. ......................................... 318/254; 363/41
(58) Field of Search .................................. 318/254, 799, 318/800, 801, 809; 363/37, 41

(56) References Cited

U.S. PATENT DOCUMENTS

| | | | |
|---|---|---|---|
| 4,368,411 | * | 1/1983 | Kidd ............................... 318/254 |
| 4,528,486 | * | 7/1985 | Flaig et al. ...................... 318/254 |
| 4,928,043 | * | 5/1990 | Plunkett .......................... 318/254 |
| 5,420,492 | * | 5/1995 | Sood et al. ...................... 318/809 |
| 5,469,032 | * | 11/1995 | Otake ............................... 318/439 |
| 5,550,450 | * | 8/1996 | Palko et al. .................... 318/800 |
| 5,689,162 | * | 11/1997 | Li .................................... 318/599 |
| 5,736,825 | * | 4/1998 | Kaura et al. .................... 318/599 |
| 5,821,707 | * | 10/1998 | Kim ................................. 318/254 |
| 5,929,577 | * | 7/1999 | Neidorff et al. ................ 318/254 |

* cited by examiner

Primary Examiner—Robert E. Nappi
Assistant Examiner—Rina I. Duda
(74) Attorney, Agent, or Firm—Westman, Champlin & Kelly P.A.; S. Koehler

(57) ABSTRACT

A system and method for controlling energization of an electric motor (rotating or linear). The system and method includes producing a pulse-width modulated command signal to control switching devices that connect the motor to an energization source. A pulse-width modulated duty cycle value is formed as a function of the pulse-width modulated command signal. A leading current with respect to the phase angle of the back EMF is provided to the motor as a function comparing the pulse-width modulated duty cycle value with a selected threshold.

22 Claims, 4 Drawing Sheets

CLOSED LOOP CONTROL OF PWM DUTY CYCLE

BACKGROUND OF THE INVENTION

This invention relates to electronic control systems for electric motors. More particularly, this invention relates to a pulse-width modulated (PWM) control system.

Direct current (DC) brushless motors are attracting growing attention for a wide variety of industrial applications. The DC brushless motors are often used in servo control systems. A DC brushless motor generally includes a permanent magnet rotor or a wound rotor and a set of stator windings. The windings are commutated by solid state switches controlled in response to a signal from a rotor position sensor, which is directly related to the back EMF (electro-motive force) of the motor.

At low speeds, it is preferable to commutate the motor such that the current supplied to the stator windings is "in phase" (zero phase difference) with the back EMF of the rotor. However, as operating speed is increased in the motor, it then becomes desirable to provide a phase advance or a leading current to the stator windings. The leading current compensates for the inductance of the stator windings as well as the back EMF generated by the windings.

In the simplest form of providing phase advance, commutation is adjusted as a function of rotor speed to provide the leading current. For example, many controllers now incorporate a digital signal processor or other microcontroller to control commutation of the switching devices. A lookup table can be provided to store phase advance values. The microcontroller accesses the lookup table as a function of rotor speed and obtains the desired phase adjustment.

In yet more sophisticated embodiments, the lookup table can be two dimensional. As appreciated by those skilled in the art, the preferred phase adjustment for a leading current may be a function of both rotor speed and the load on the motor. Typically, motor load is related to the amplitude of the current provided to the stator windings. The lookup table thus can provide values indicative of phase adjustment as a function of both rotor speed and motor load.

However, a significant disadvantage of lookup tables is that the values must be predetermined in order to provide the proper phase advance. In other words, motor parameters, such as the inductance of the motor and the back EMF coefficient and/or other related parameters such as drive bus voltage must be assumed, premeasured or otherwise ascertained to calculate the correct phase adjustment to be entered in the lookup table. Of course, if the calculated or assumed values are in error, motor performance suffers. Likewise, if the operating characteristics of the motor change, the lookup table values are again in error.

In view of the shortcomings of current designs, there is a continuing need for an improved motor control system that can selectively generate a leading current.

SUMMARY OF THE INVENTION

A system and method for controlling energization of an electric motor (rotating or linear). The system and method includes producing a pulse-width modulated command signal to control switching devices that connect the motor to an energization source. A pulse-width modulated duty cycle value is formed as a function of the pulse-width modulated command signal. A leading current with respect to the phase angle of the back EMF is provided to the motor as a function comparing the pulse-width modulated duty cycle value with a selected threshold.

DETAILED DESCRIPTION OF THE ILLUSTRATIVE EMBODIMENTS

Figure 1:
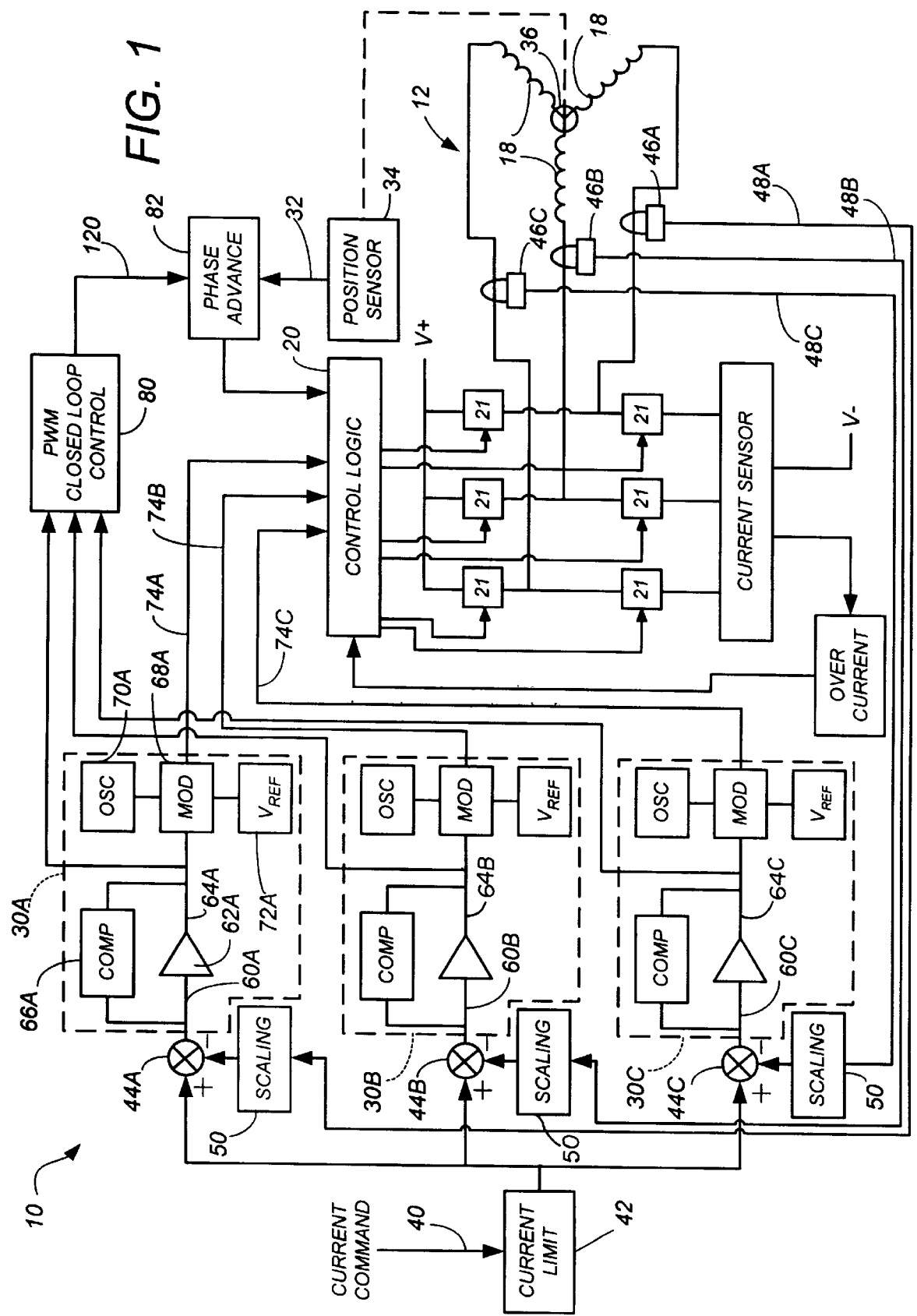
FIG. 1 is a general block diagram of a control system having a phase advance circuit of the present invention connected to a brushless DC motor.

FIG. 1 illustrates an exemplary motor control system 10 for controlling the flow of current to a rotating or linear DC brushless motor 12. Generally, the motor 12 includes a permanent magnet or wound rotor and a set of stator windings 13. The control system 10 includes a switching circuit or bridge 14 that is coupled to stator windings 13. The control system 10 includes control logic 20 for providing control signals for operating switching devices 21 of the switching circuit 14. The control logic 20 receives control signals from at least one and, in the exemplary embodiment illustrated, three pulse-width modulators 30A, 30B and 30C. The control logic 20 also receives a signal 32 indicative of the phase angle of back EMF of the motor 12. In the embodiment illustrated, the signal 32 is from a position sensor 34 (e.g. encoder, resolver, discrete sensors, etc.) that measures or senses a relative position of a rotor 36. As is well known, the phase angle of the back EMF is related to the position of the rotor 36, thus a signal indicative of position of the rotor 36 is also indicative of the back EMF of the motor 12. However, it should be noted that this technique is but one exemplary method for providing a signal indicative of the phase angle of the back EMF and that other methods and systems can be used. For purposes of the present invention these methods can also be used to provide the back EMF signal 32. For instance, it is well known that the phase angle of the back EMF can also be measured or sensed directly.

As is well known in the art, a current command is generally provided at 40 and is usually indicative of a desired torque to be generated by the motor 12. In some embodiments, a current limiter 42 receives the current command 40 and limits the maximum operating torque of the motor 12. The current command 40, or a limited value thereof, is applied to summing junctions 44A, 44B and 44C that are associated with each of the pulse-width modulators 30A, 30B and 30C, respectively. A second input of each of the summing junctions 44A, 44B and 44C is indicative of the actual current flowing to the motor 12 in each of the phases. In the embodiment illustrated, current sensors 46A, 46B and 46C sense the current flowing in each of the phases and provide a signal representative of each of the flowing currents along signal lines 48A, 48B and 48C, respectively. Each of the summing junctions 44A, 44B and 44C compares the actual current flowing in each respective phase of the motor with the desired current on signal line 42. If necessary, scaling circuits 50 are provided to adjust the magnitude of the signals on signal lines 48A–48C to make a proper comparison.

Each of the summing junctions 44A–44C generate a loop error or correction signal 60A, 60B and 60C that is provided to each of the pulse-width modulator circuits 30A, 30B and 30C, respectively. Referring to pulse-width modulator circuit 30A by way of example, the loop error 60A is adjusted by a gain element 62A to provide a pulse-width modulated command signal 64A. As appreciated by those skilled in the art, compensation circuitry 66A can also be used to generate the pulse-width modulated command signal 64A. The pulse-width modulated command signal 64A is provided to a modulator 68A that also receives a reference dither signal from an oscillator 70A and a reference threshold indicated at 72A. The modulator 68A generates a control signal 74A that is received by the control logic 20 to operate the switching circuit 14. Pulse-width modulator circuits 30B and 30C operate similarly to generate pulse width command signals 64B and 64C and to provide control signals 74B and 74C.

As discussed in the background section, at low speeds the current flowing to the motor 12 is generally in phase with the phase angle of the back EMF of the motor 12; however, at higher speeds it is desirable to provide a leading current to the motor 12. One aspect of the present invention is a method and system for generating a leading current in a closed feedback loop as a function of operation of at least one of the pulse-width modulators 30A, 30B and 30C. In the embodiment illustrated, pulse-width modulated command signals 64A, 64B and 64C are received by a pulse PWM closed loop control circuit 80. The PWM closed loop control circuit 80 forms or generates a pulse-width modulated duty cycle value as a function of the pulse-width modulated command signals 64A–64C. The PWM closed loop control circuit 80 selectively adjusts a phase relationship of the current provided to the motor 12 and the back EMF of the motor 12 as a function of comparing the actual pulse-width modulator duty cycle value with a selected threshold. In the embodiment illustrated, the PWM closed loop circuit 80 adjusts the back EMF indicative signal 32 with a phase advance 82.

At this point, it should be emphasized that the motor control circuit 10 is but one exemplary embodiment that can benefit from use of the PWM closed loop control circuit 80. As appreciated by those skilled in the art, although the exemplary motor control circuit 10 incorporates three pulse-width modulators 30A–30C that are controlled by a current loop comprising measured current feedback signals on signal lines 48A–48C, other motor variations are well-known. For example, in other motor control systems a single pulse-width modulator circuit receives current feedback from a current loop having one or more current sensors 46A–46C. In addition, the pulse-width modulator circuits 30A–30C are generally depicted wherein a specific implementation may include modified circuits and components. Generally, the PWM closed loop control circuit 80 receives a signal from at least one pulse-width modulator circuit 30A–30C that is indicative of operation of the pulse-width modulator circuit, and in particular, a signal indicating when the motor is operating at higher speeds. It should also be noted that the components or modules depicted in FIG. 1 are functional in that actual implementation can take the form of digital components, analog components, and/or software routines operable on a microcontroller, digital signal processor, or the like. Likewise, the signals appearing on each of the signal lines depicted in FIG. 1 can be analog or digital with appropriate conversion elements, if necessary, as is well known in the art.

Figure 2:
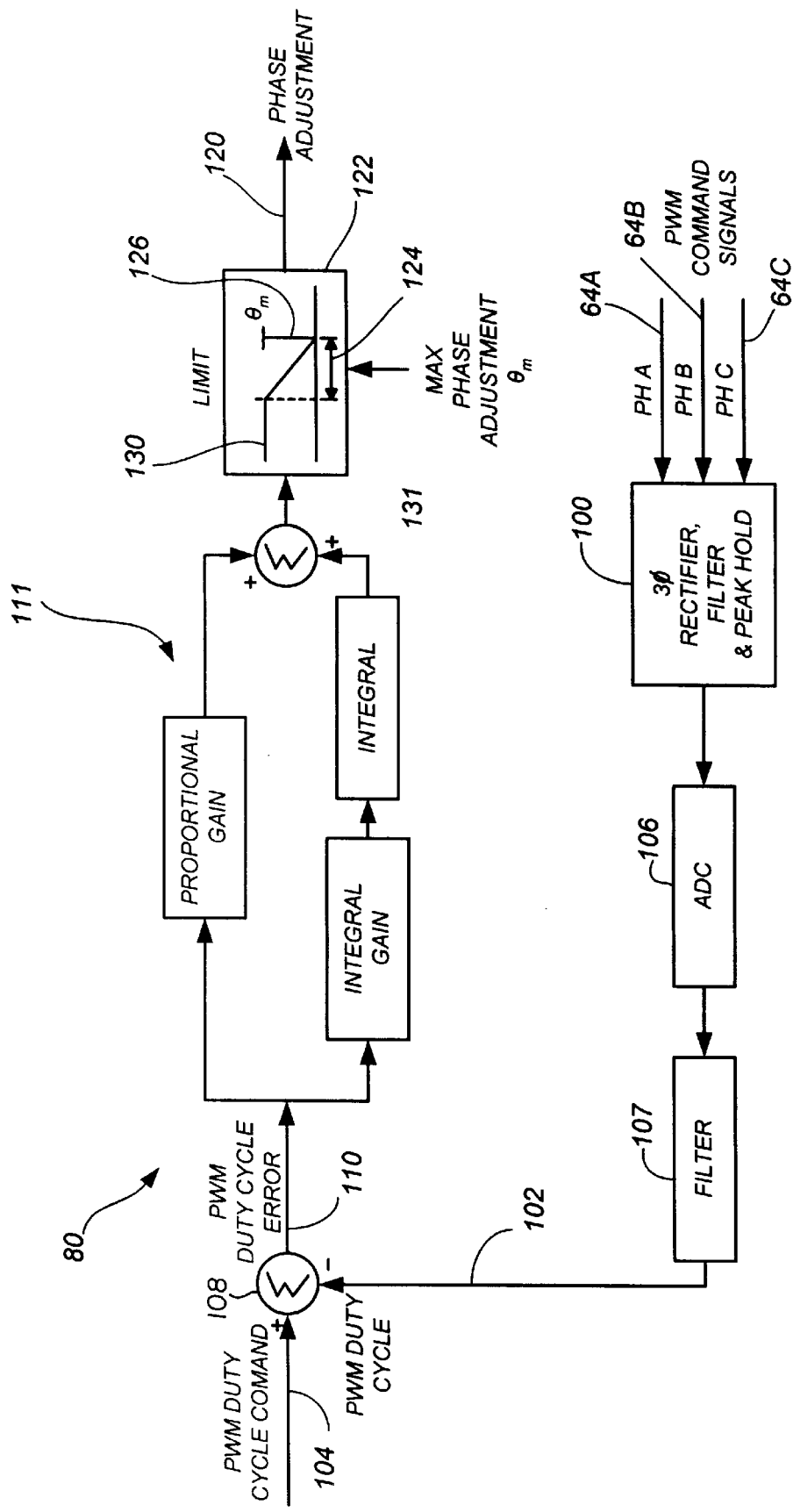
FIG. 2 is a block diagram of the phase advance circuit.

The PWM closed loop control circuit 80 is illustrated in detail in FIG. 2. In the embodiment illustrated, the pulse-width modulator command signals 64A–64C are received by a signal processing circuitry 100. For analog pulse-width modulated command signals, the processing circuitry 100 can comprise a rectifying and peak/hold circuit. A filtering circuit can also be provided if desired. The PWM closed loop control circuit 80 forms or generates a signal on signal line 102 indicative of the actual PWM duty cycle as obtained from signals of the pulse-width modulators 30A–30C, and in particular the pulse-width modulator command signals 64A–64C. In the embodiment illustrated, the PWM duty cycle signal 102 comprises a value that is compared to a selected threshold PWM duty cycle command value provided at 104. In the embodiment illustrated, an analog-to-digital converter 106 and a filter 107 are provided. Of course, digital conversion and filtering can occur at other locations in the circuit. Alternatively, analog signals can be used.

A summing junction 108 generates a PWM duty cycle error 110 as a function of comparing the actual PWM duty cycle 102 with the selected threshold 104. The selected threshold represents how close to the bus voltage, the peak voltage provided to the motor 12 required to meet the pulse-width modulator command signals 64A–64C is allowed to go. The signal obtained at 110 is provided to conventional gain control elements such as a proportional and integral elements 111 to calculate an adjustment in phase required to maintain the peak output voltage of the power supplied to the motor within desired bounds. The adjustment in phase is indicated at signal line 120. In a preferred embodiment, the signal 120 is provided to a limiter 122 that provides proportional phase adjustment over a desired range (e.g. 0 to 90 degrees) as indicated by double arrow 124, no phase adjustment for errors corresponding to pulse-width modulate command signals less than the threshold PWM duty cycle command 104 (indicated at 126 in limiter 122), and to limit a maximum phase advance 130 to a reasonable value based on motor and drive design characteristics. If desired, the maximum phase adjustment can be adjustable as indicated at 131. It should be noted that zero phase advance would correspond to normal phasing for maximum torque for a given current.

The phase adjustment signal 120, or if desired, a limited value thereof, is applied to the control system 10 herein illustrated at 82 to adjust the relative phase of the PWM command signals 64A–64C with respect to the back EMF of the motor 12, which in turn adjusts the relative phase of the current provided to the motor 12 with respect to the back EMF. In the embodiment illustrated, the phase advance adjusts the position signal 32 received by the position sensor 32. It should be noted that merely providing phase advance of the current to the motor is not new and can be performed using a number of digital and analog techniques in the control system. However, one aspect of the present invention includes providing closed loop control of the phase advance. In the embodiment illustrated, closed loop control is provided as a function of operating signals from a pulse-width modulator.

Figure 3:
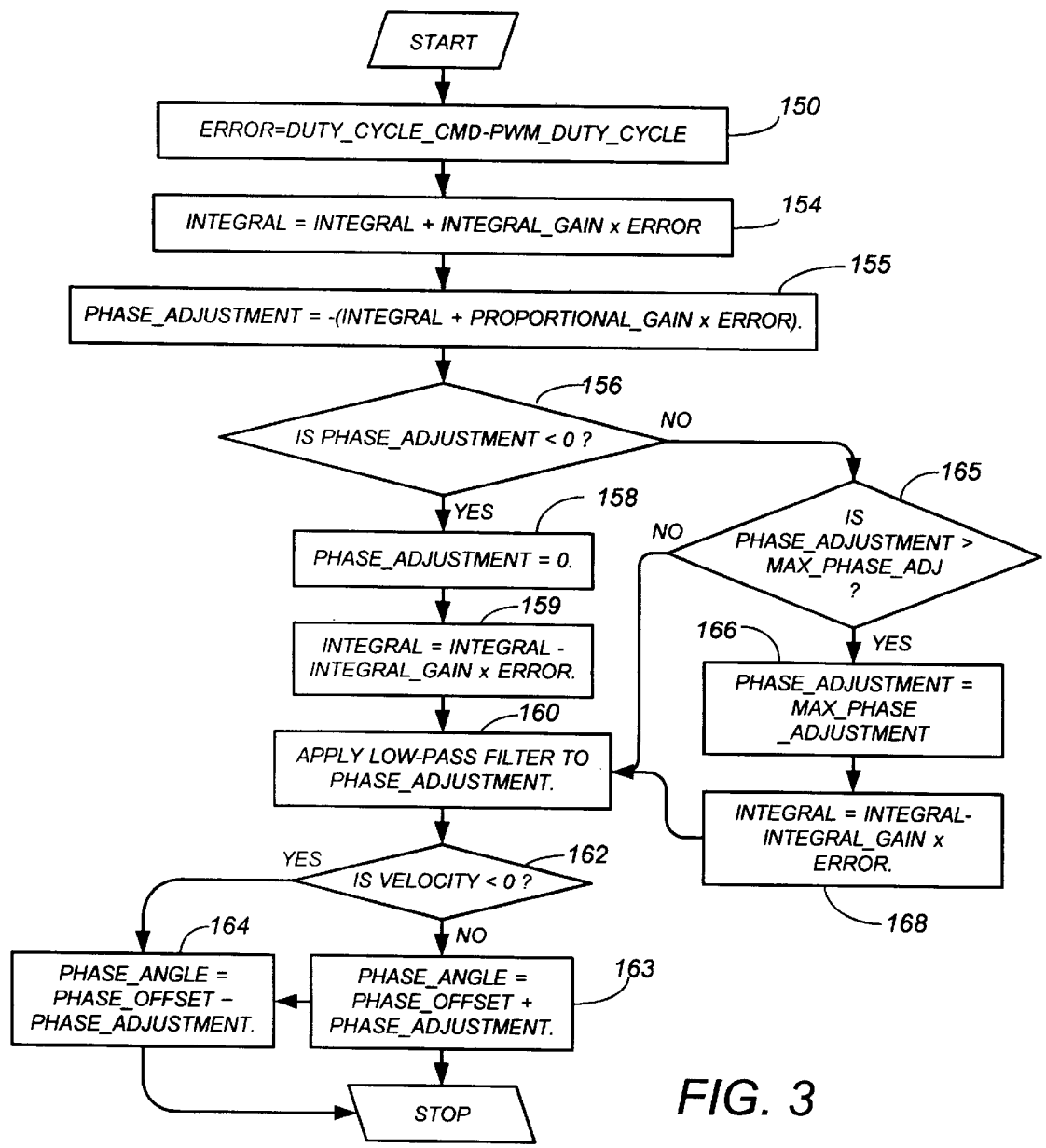
FIG. 3 is an exemplary flow chart for providing a phase adjustment.

FIG. 3 illustrates an exemplary flow chart for calculation of the phase adjustment signal 120. The flow chart can be implemented with analog components or on a suitable microcontroller or digital signal processor. At step 150 the PWM duty cycle error signal 108 is calculated as a difference between signals 102 and 104. An integral function of the PWM duty cycle error is calculated at step 154. The phase adjustment signal is then calculated at step 155 wherein, in the embodiment illustrated, the phase adjustment signal is function of an integral function and a proportional function of the PWM duty cycle error signal 108.

At decision block 156, the phase adjustment signal 120 is compared to zero, and if the phase adjustment signal 120 is less than zero, processing flow continues to step 158 whereat the phase adjustment is set equal to zero. Step 159 is provided to prevent integral windup. If desired, as illustrated at step 160, the phase adjustment signal can be provided through a low-pass filter to reduce noise and ripple.

At decision block 162, the direction of the motor is ascertained herein by analyzing whether the velocity is positive or negative. Depending on the direction or rotation, the phase adjustment signal 120 is added or subtracted to a phase offset value to calculate a phase angle for each phase of the motor. For example, if the phase adjustment signal is calculated with respect to phase A of the motor, phase offsets equal to 120 degrees and 240 degrees would be used for the other phases in a three-phase motor. Steps 163 and 164 provide the necessary offsets as a function of rotation.

Referring back to decision block 156, if the phase adjustment signal is greater than zero, processing flow continues to decision block 165 whereat the phase adjustment signal is compared to the maximum phase adjustment allowed. If the phase adjustment signal does not exceed the maximum phase adjustment allowed, processing flow continues to step 160. Alternatively, processing flow continues to step 166 whereat the phase adjustment signal is set to the maximum phase adjustment signal allowed. Step 168 is similar to step 159 and is performed to prevent integration windup. Processing flow then continues to step 160 and subsequently to decision block 162 in the manner described above.

Figure 4:
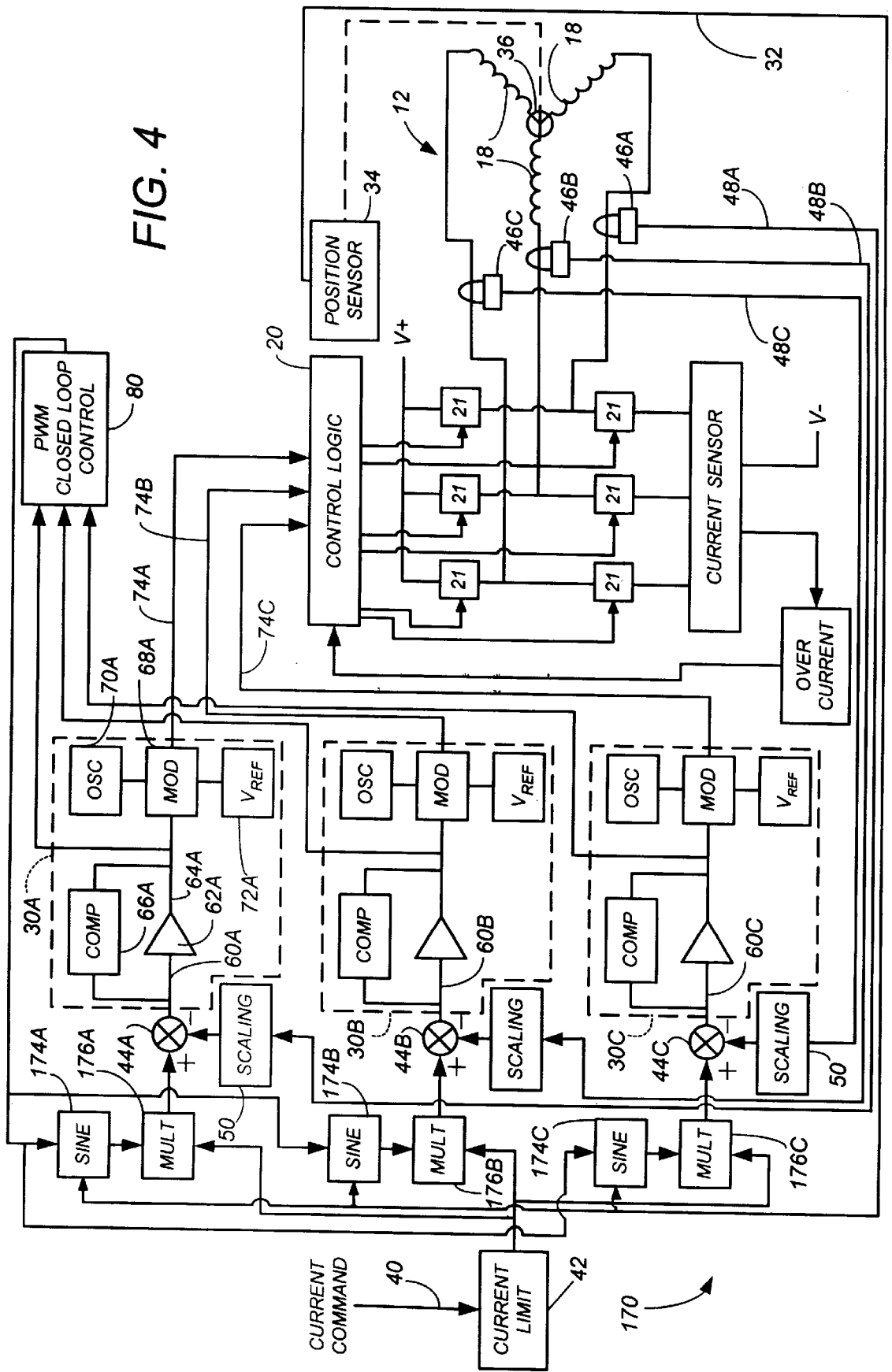
FIG. 4 is a block diagram of a control system for a sinusoidal motor.

It should be noted that the PWM closed loop control circuit 80 can be incorporated in any DC brushless motor control scheme. For example, the embodiment of FIG. 1 can be considered a trapezoidal control circuit that generates trapezoidal drive currents. Of course, other shapes of drive currents can be generated. For instance, FIG. 4 illustrates a control circuit 170 suitable for generating sinusoidal drive currents. In particular, the pulse-width modulators 30A–30C each include a sinusoidal generator 174A, 174B and 174C, respectively. Multipliers 176A, 176B and 176C are also provided and multiply the current command 40 with a references sinusoidal waveform produced by the sinusoidal generators 174A, 174B and 174C. The outputs from multipliers 176A–176C are provided to summers 44A–44C, respectively. In this motor control scheme, the phase adjustment output signal from the PWM closed loop control circuit 80 can be provided as an input to each of the sinusoidal generators 174A, 174B and 174C. The sinusoidal generators 174A, 174B and 174C combine the phase adjustment signal 32 with the position signal received from the position sensor 34 in order to generate each of the reference sinusoidal waveforms. As appreciated by those skilled in the art, the sinusoidal generators 174A, 174B and 174C are but one form of waveform generators. If desired, other waveform generators, including a trapezoidal waveform generator, or generators that can be used to compensate for motor back EMF characteristics can also be used.

Although the present invention has been described with reference to preferred embodiments, workers skilled in the art will recognize that changes may be made in form and detail without departing from he spirit and scope of the invention.

What is claimed is:

1. A system for controlling energization of an electric motor from an electric power source, the system comprising:
    a switching circuit including switching devices to selectively connect windings of the motor to the power source;
    a pulse-width modulator capable of producing a pulse-width modulated command signal to control the switching devices; and
    a circuit receiving the pulse-width modulated command signal and comparing a parameter thereof with a selected threshold to generate a phase adjustment signal, the phase adjustment signal being indicative of a selected leading current to be provided to windings of the motor.

2. The system of claim 1 wherein the parameter comprises a pulse-width modulated duty cycle value.

3. The system of claim 1 wherein the pulse-width modulator is capable of producing a set of pulse-width modulated command signals, one pulse-width command signal for each phase of the motor, and wherein the circuit receives at least one of the pulse-width modulated command signals.

4. The system of claim 3 wherein the circuit receives the set of pulse-width modulated command signals.

5. The system of claim 4 wherein the circuit includes a multi-phase rectifier.

6. The system of claim 1 wherein circuit comprises:
    a summer to generate a difference signal between the parameter and the selected threshold; and
    a gain module receiving the difference signal and generating the phase adjustment signal as a function of the difference signal.

7. The system of claim 6 wherein the gain module comprises a proportional and integral function of the difference signal.

8. The system of claim 1 wherein the circuit includes a limiting module receiving the phase adjustment signal and limiting the phase adjustment signal to a selected range.

9. The system of claim 1 wherein the pulse-width modulator command signal is adjusted as a function of the phase adjustment signal.

10. The system of claim 9 wherein the pulse-width modulator includes a reference signal generator for generating a reference signal arid wherein the pulse-width modulator receives the phase adjustment signal to adjust the reference signal.

11. The system of claim 1 and further comprising:
    a position sensor sensing a position of a rotor of the motor; and
    means receiving a signal from the position sensor, the means adjusting the signal from the position sensor as a function of the phase adjustment signal and providing an adjusted signal to the switching circuit.

12. A motor control system comprising:
    a brushless direct current motor including:
    a set of stator windings;
    a rotor movable relative -to the set of stator windings;
    a sensor providing a signal indicative of a phase angle of a back EMF of the motor;
    a switching circuit including switching devices to selectively connect windings of the motor to a power source;
    a pulse-width modulator capable of producing a pulse-width modulated command signal to control the switching circuit;
    a circuit receiving the pulse-width modulated command signal and comparing a parameter thereof with a selected threshold to generate a phase adjustment signal; and
    means for adjusting a phase of current provided to the motor with respect to the phase angle of the back EMF as a function of the phase adjustment signal.

13. The motor control system of claim 12 wherein the means for adjusting receives the signal indicative of the back EMF of the motor and provides an adjusted signal as a function of the phase adjustment signal.

14. The motor control system of claim 12 wherein the pulse-width modulator includes a reference signal generator for generating a reference signal, and wherein the means for adjusting comprises adjusting the reference signal as a function of the phase adjustment signal.

15. A method for controlling energization of an electric motor from an electric power source using a switching circuit including switching devices to selectively connect windings of the motor to the power source, the method comprising:

producing a pulse-width modulated command signal to control the switching devices;

forming a pulse-width modulated duty cycle value as a function of the pulse-width modulated command signal; and adjusting a phase relationship of current provided to the motor as a function of comparing the pulse-width modulated duty cycle value with a selected threshold.

16. The method of claim 15 and further comprising:

limiting an adjustment of the phase relationship to a selected range.

17. The method of claim 15 wherein adjusting a phase relationship of current provided to the motor includes adjusting a relative phase of the pulse-width modulated command signal with respect to a back EMF of the motor.

18. The method of claim 15 and further comprising:

obtaining a signal indicative of a phase angle of a back EMF of the motor.

19. The method of claim 18 wherein obtaining includes sensing a position of a rotor of the motor.

20. The method of claim 19 wherein producing a pulse-width modulated command signal includes using a signal indicative of the position of the rotor, and wherein adjusting the phase relationship of current provided to the motor includes adjusting the signal indicative of the position of the rotor.

21. The method of claim 17 wherein obtaining includes sensing the phase angle of the back EMF of the motor.

22. The method of claim 15 wherein producing a pulse-width modulated command signal includes using a reference signal, and wherein adjusting the phase relationship of current provided to the motor includes adjusting the reference signal.

* * * * *